United States Patent [19]

Takada

[11] Patent Number: 5,151,139
[45] Date of Patent: Sep. 29, 1992

[54] HEAVY DUTY RADIAL TIRE HAVING DURABLE BUTTRESS PORTION

[75] Inventor: Yoshiyuki Takada, Kobe, Japan

[73] Assignee: Sumitomo Rubber Industries, Ltd., Hyogo, Japan

[21] Appl. No.: 666,376

[22] Filed: Mar. 8, 1991

[30] Foreign Application Priority Data

Mar. 9, 1990 [JP] Japan .................................. 2-58801

[51] Int. Cl.$^5$ ............................ B60C 3/00; B60C 3/04
[52] U.S. Cl. ................................................... 152/454
[58] Field of Search ...................... 152/454, 453, 209 B

[56] References Cited

U.S. PATENT DOCUMENTS

| | | | |
|---|---|---|---|
| 4,408,648 | 10/1983 | Ohashi | 152/454 |
| 4,662,416 | 5/1987 | Yagi et al. | 152/454 X |

FOREIGN PATENT DOCUMENTS

| | | | |
|---|---|---|---|
| 0192910 | 9/1986 | European Pat. Off. | 152/454 |
| 0397380 | 11/1990 | European Pat. Off. | 152/454 |

*Primary Examiner*—Michael W. Ball
*Assistant Examiner*—Adrienne C. Johnstone
*Attorney, Agent, or Firm*—Birch, Stewart, Kolasch & Birch

[57] ABSTRACT

The invention is directed to a heavy duty radial tire having improved durability in the buttress at the radially upper portion of the sidewall. Such improvement is obtained by thickening the buttress region according to specific relationships between points on the sidewall profile. The sidewall profile is divided into a radially outer part extending from a point Q to a point R, a radially inner part extending between the tire maximum section point M and point R, and a middle part extending between points Q and R wherein the outer part is defined by a first circular arc arcing inwardly of the tire and the inner part is defined by a second circular arc arcing outwardly of the tire, the point R being the inflection point between the two arcs. Point Q is located at a radial height in the range of the edge height of the widest belt ply plus or minus 5 mm while point R is located radially inward of the tread edge in a range of 0.21 to 0.30 times the tread width and axially outward from the tire equator in a range of 0.52 to 0.57 times the tread width.

2 Claims, 5 Drawing Sheets

HEAVY DUTY RADIAL TIRE HAVING DURABLE BUTTRESS PORTION

The present invention relates to a radial ply tire for heavy duty use, in which strain generated in buttress portions of the tire during running is reduced to improve the durability of the tire.

BACKGROUND OF THE INVENTION

In heavy duty tires for truck, bus and the like, wherein the tread portion is subjected to a large load, as shown in FIG. 5, a buttress portion (a) or an upper sidewall part which supports the large load is provide with a profile composed of two arcs: a radially inner arc r1 indicates the outward curvature in the sidewall of the tire with a center located inside the tire on a straight line drawn axially of the tire from the tire maximum width point m; and a radially outer arc r2 having a center outside the tire and indicating an inward curvature of the radially outer portion of the sidewall of the tire and extending from the tread edge (e) to the inflection point (r) between the two arcs r1 and r2.

As a result, the buttress portion (a) is formed in a single radius arc, and a point at which compressive strain increases over 30% was found. Such compressive strain lowers the durability of the buttress portion (a). Especially, when the tire has an extra heavy tread with deep tread grooves, the compressive stress becomes very large in the middle part of the buttress portion (a) since the tread rubber largely moves axially outwardly at the tread edges during running, which compresses the sidewall rubber in the buttress portion.

Upon the inventor's investigation of stress distribution in the buttress portion (a), it was found that the largest stress lies in a region between the above-mentioned inflection point (r) and a point (c) at which an axial line extended from the edge of the widest belt ply b intersects with the surface of the buttress portion.

SUMMARY OF THE INVENTION

It is therefore, an object of the present invention to provide a heavy duty radial tire, in which, by increasing the rubber thickness in the above-mentioned region in a specific manner, a compressive strain generated in the buttress portion is reduced to improve the durability of the buttress portion.

According to one aspect of the present invention, a heavy duty radial tire comprises a radical carcass having at least one ply of cords extending between bead portions through sidewall portions and a tread portion of the tire, a thread disposed radially outside the carcass, and a belt comprising at least two plies of cords disposed radially outside the carcass and inside the tread, in a state that the tire is mounted on its regular rim and inflated to its maximum pressure, the thread width between the tread edges being not less than 0.73 times the tire maximum width (W), and the tire profile between the tread edge and the tire maximum section width point being composed of a radially outer part between the tread edge and a point Q, a radially inner part between the tire maximum section width point and a point R, and a middle part between said points Q and R, the radially outer part having a circular arc arcing inwardly of the tire and having a single radius of curvature R2 and a center outside of the tire, the radially inner part having a circular arc arcing outwardly of the tire and having a single radius of curvature R1 and a center positioned inward of the tire on an axial straight line Xm drawn from the tire maximum section width point, the point Q located at a radical height in the range of the edge height of the widest ply of the belt plus or minus 5 mm, the point R located at a radical height defined such that the outwardly arcing circular arc of the radially inner part and the inwardly arcing circular arc of the radially outer part extended from the point Q to the point R are smoothly connected to each other at the point R as the inflection point therebetween, the middle part being a straight or curved line located axially outside of the extended part of the inwardly arcing circular arc of the radially outer part so that the distance from a straight line N, to this middle part line, measured normally to this straight line N is not more than 2 mm, wherein the straight line N is extended radially inwardly from the point Q toward the point R inclining axially outwardly at an angle of 4 to 15 degrees with respect to a tangential line to the inwardly arcing circular arc at the point Q.

Preferably, the point R is located at a radial distance, from the tread edge, in a range of 0.21 to 0.30 times the tread width and an axial distance, from the tire equator, in a range of 0.52 to 0.57 times the tread width.

BRIEF DESCRIPTION OF THE DRAWINGS

An embodiment of the present invention will now be described in detail with reference to the accompanying drawings, in which.

PREFERRED EMBODIMENT OF THE INVENTION

Figure 1:
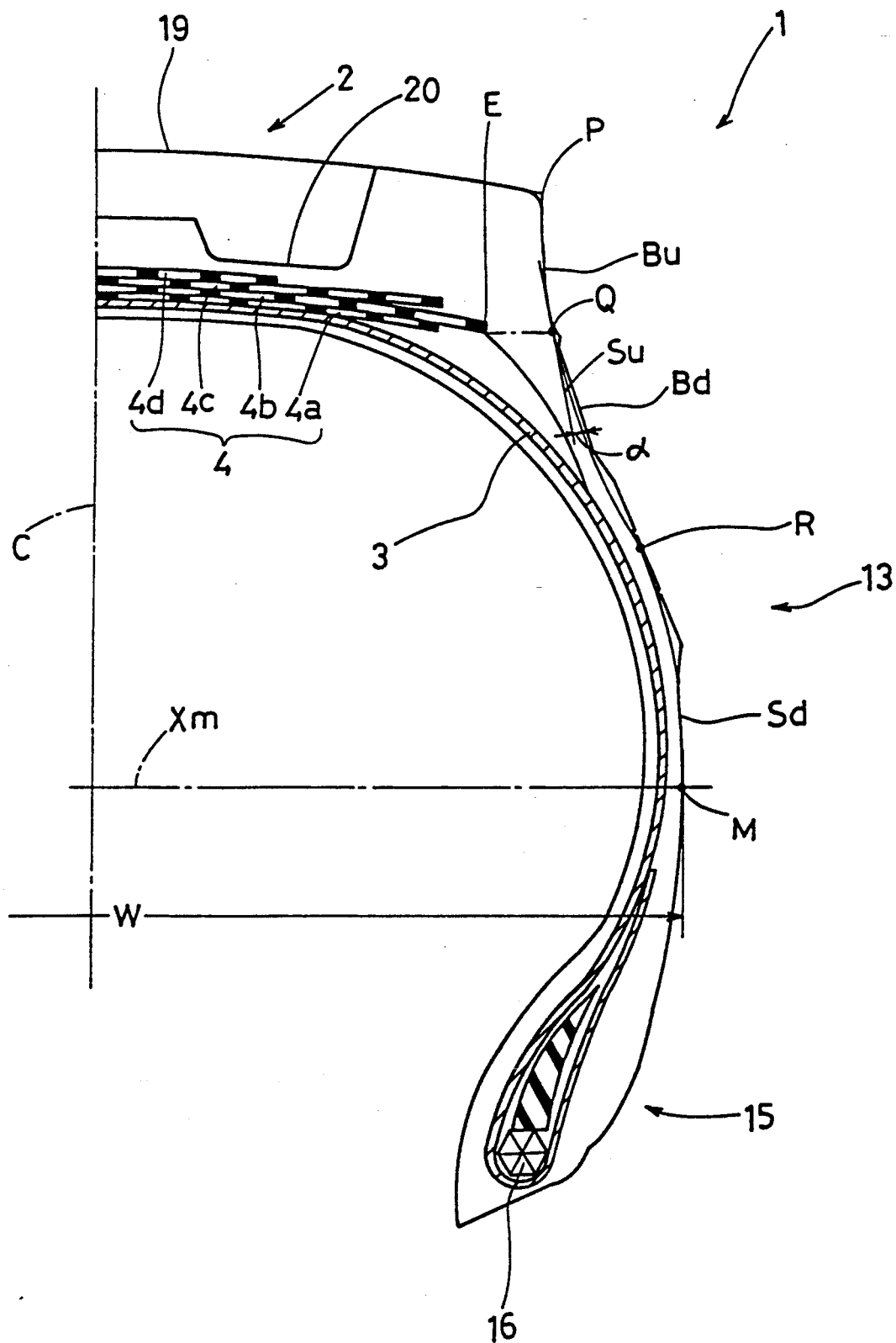
FIG. 1 is a cross sectional view showing a right half of an embodiment of the present invention.

In the figures, heavy duty radial tire 1 of the invention has a tread portion 2, a pair of axially spaced and bead portions 15, and a pair of sidewall portions 13 extending radially inwardly from the edges of the tread portion 2 to the bead portions 15.

In a normal inflated condition in which the tire is mounted on its regular rim and inflated to its maximum pressure, the tread width TW between the tread edges P is not less than 0.73 times the tire maximum section width W.

The tire comprises a pair of bead cores 16 disposed one in each bead portion 15, a carcass 3 extending between the bead portions 15 and turned up around the bead cores 16, tread rubber and sidewall rubber disposed on the carcass, and a belt layer 4 disposed radially outside the carcass 3 and inside the tread rubber.

The carcass 3 is composed of one or more plies of rubberized cords arranged radially of the tire at angles of 90 to 30 degrees with respect to tire equator C so as to provide for the carcass a radial ply construction or a semiradial ply construction. In this embodiment, the carcass is composed of one ply of a radial ply construction.

For the carcass cord, organic fiber cords, e.g. nylon, polyester, rayon, aromatic polyamide and the like can be used.

The belt layer 4 is composed of at least two plies (4a, 4b) of parallel cords, in this example, four plies of the radially innermost first ply 4a, the second ply 4b, the third ply 4c, and the radially outermost fourth ply 4d.

The cords of each belt ply are laid at a bias angle with respect to the tire equator C so as to cross the cords of the next ply.

For the belt cords, steel cords and organic fiber cords, e.g. nylon, polyester, rayon, aromatic polyamide and the like can be used.

The second belt ply 4b is wider than the first belt ply 4a. In this example, the belt plies satisfy the following condition:

2nd ply width > 1st ply width > 3rd ply width > 4th ply width That is the second belt ply 4b is widest, and the edges thereof are nearest to the buttress portion.

The tread is provided in the radially outer face 19 with relatively deep tread grooves 20. The tread rubber thickness and tread groove depths are of EHT class. (Extra Heavy Tread specified by Tire Rim Association in the U.S.A.)

The profile of the tire in the above-mentioned normal inflated condition between the tread edge P and a tire maximum section width point M (that is, a buttress part B and an upper sidewall part) is determined based on a standard line Ss.

In the present invention, the tire profile is treated, eliminating lettering and decorative protrusion and indentation and circumferentially spaced ribs or grooves for the purpose of prevention of scratch and the like which have no effect on the behavior of the sidewall rubber, from the consideration.

The standard line Ss is composed of two parts: a radially inner part Sd extending between the maximum section width point M and an inflection point R, and a radially outer part Su extending between the tread edge P and the inflection point R.

The inner part Sd is defined by a circular arc arcing outwardly of the tire and having a single radius of curvature R1 with a center inward of the tire on a straight line Xm drawn from the maximum width point M in parallel with the axial direction of the tire. The outer part Su is defined by a circular arc arcing inwardly of the tire and having a single radius of curvature R2 with a center outside of the tire. The arcs are smoothly connected to each other at the inflection point R.

The position of the inflection point R is generally determined by giving the radial height for the tire maximum section width point M and setting the radius ratio R1/R2 in the range of 1.5 to 3.0, which is usually used. In this embodiment, however, the inflection point R is set at a radius distance Xr in a range of 0.21 to 0.30 times the tread width TW from the tread edge P and a distance Yr of 0.52 to 0.57 times the tread width TW from the tire equator C in the axial direction.

A point Q is located on the radially outer part Su of the standard line Ss at a radial height in the range of the height of the widest belt ply edge E, in this embodiment the second belt ply edge, plus or minus 5 mm in the radial direction.

That is, the point Q is located on the standard line Ss and in a range extending 5 mm in the radial direction radially inwardly and outwardly from a point C of intersect between the above-mentioned standard line Ss and a straight line Xq drawn from the widest belt ply edge E in the axial direction.

The upper profile Bu between the tread edge P and the above-mentioned point Q corresponds to the radially outer part Su of the standard line Ss.

The middle profile Bd between the points Q and R is determined by a straight line N extended radially inwardly from the point Q toward the point R inclining axially outwardly at an angle (alpha) of 4 to 15 degrees with respect to a tangential line Yq to the inwardly arcing circular arc at the point Q, such that the middle profile Bd is located axially outside of the radially outer part Su of the standard line Ss, and the distance from a straight line N normally to the middle profile Bd, measured to this straight line N, is not more than 2 mm.

Figure 2:
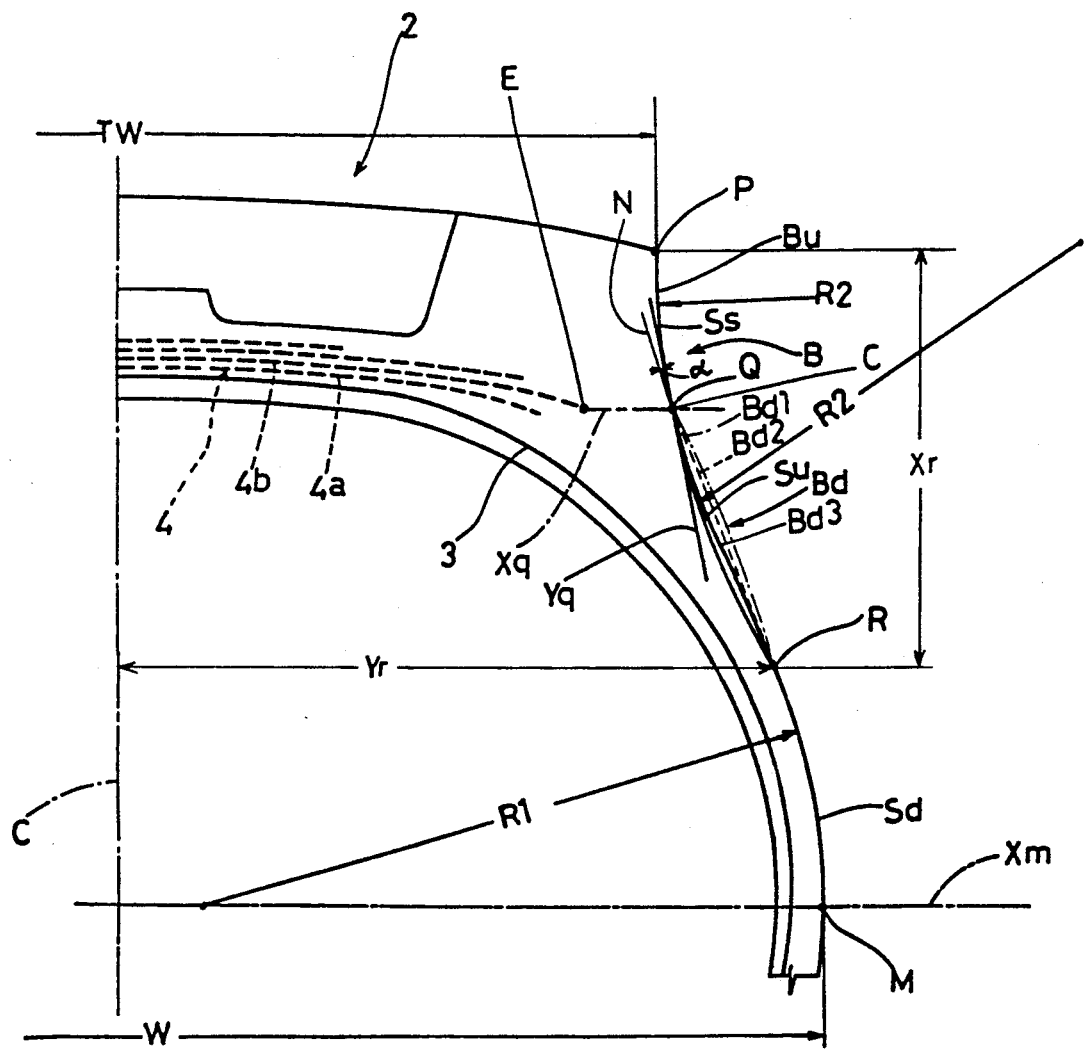
FIG. 2 is a schematic cross sectional view explaining the profile of the buttress portion thereof.

The middle profile Bd can be formed in either of a straight line or a curved line, for example as shown in FIG. 2, an arcing slightly outwardly curved line Bd1 shown by a chain line, or a straight line Bd2 shown by a broken line, or an arcing slightly inwardly curved line Bd3 shown by a full line.

When the inclination angle (alpha) is less than 4 degrees, compressive strain can not be reduced. Even if the inclination angle (alpha) is increased to more than 15 degrees, the effect on decreasing the compressive strain is not improved, and undesirably the rubber thickness of the lower buttress portion is increased to increase heat generation therefrom and also to increase the tire weight.

It is preferable from a viewpoint of reduction of compressive strain that the middle profile Bd is spaced apart from the above-mentioned standard line Ss by a distance of not less than 0.5 mm, more preferably, not less than 1 mm, and still more preferably, in the range of 2 to 7 mm.

Test tires of size 11R24.5 having the same construction as shown in FIG. 1 with profiles, as described below were prepared and tested for the compressive strain.

Working Examples tires 1-2 and Reference tires 2-5 had similar profiles excepting the inclination angles (alpha).

Reference tire 1 had a conventional profile composed of two arcs.

The inclination angles (alpha) of the test tires are listed as follows:

| Tire | Ex. 1 | Ex. 2 | Ref. 1 | Ref. 2 | Ref. 3 | Ref. 4 | Ref. 5 |
| --- | --- | --- | --- | --- | --- | --- | --- |
| Angle (degs.) | 4 | 15 | 0 | 2 | 3 | 20 | 26 |

Figure 3:
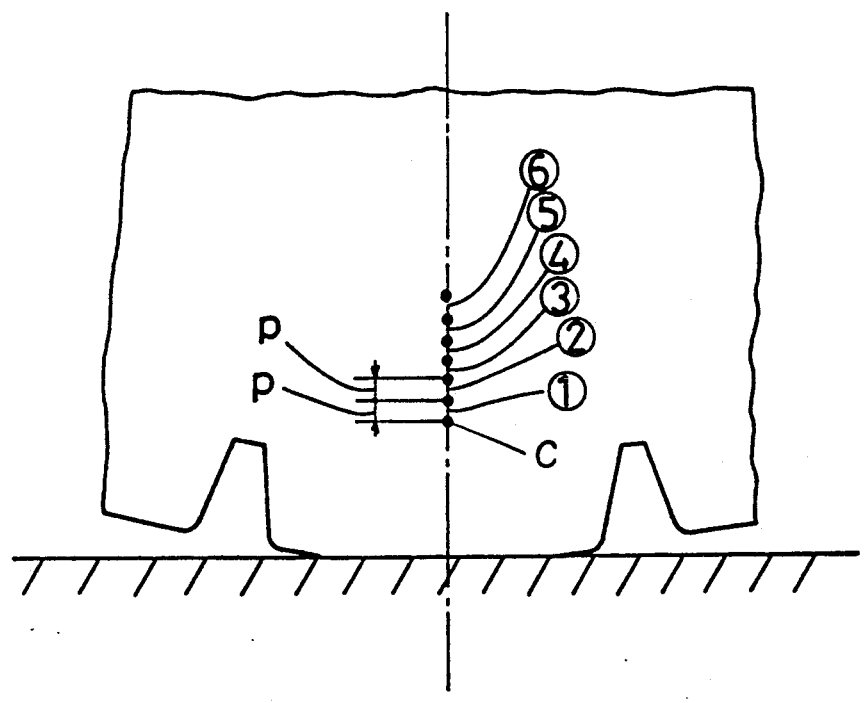
FIG. 3 is a side view explaining a method of measuring the compressive strain.

The test was made by mounting the tire on a regular rim, inflating the tire to a pressure of 0.5 kgf/sq.cm, making marks ①, ②, ③, ④, ⑤, ⑥ on the tire side face, as shown in FIG. 3, at regular pitches p of 6 mm from the point C as a starting point toward the radially inside thereof, and then increasing the tire inner pressure to 6.33 kgf/sq.cm, and loading with a normal load of 3828 kg, and measuring a decrease in each pitch caused by compression to calculate the percentage of the decrease as the compressive strain. (For example, if the pitch is decreased to 4 mm from 6 mm, the compressive strain is calculated as follows:

$$(6-4)/6 \times 100 = 33\%)$$

Figure 4:
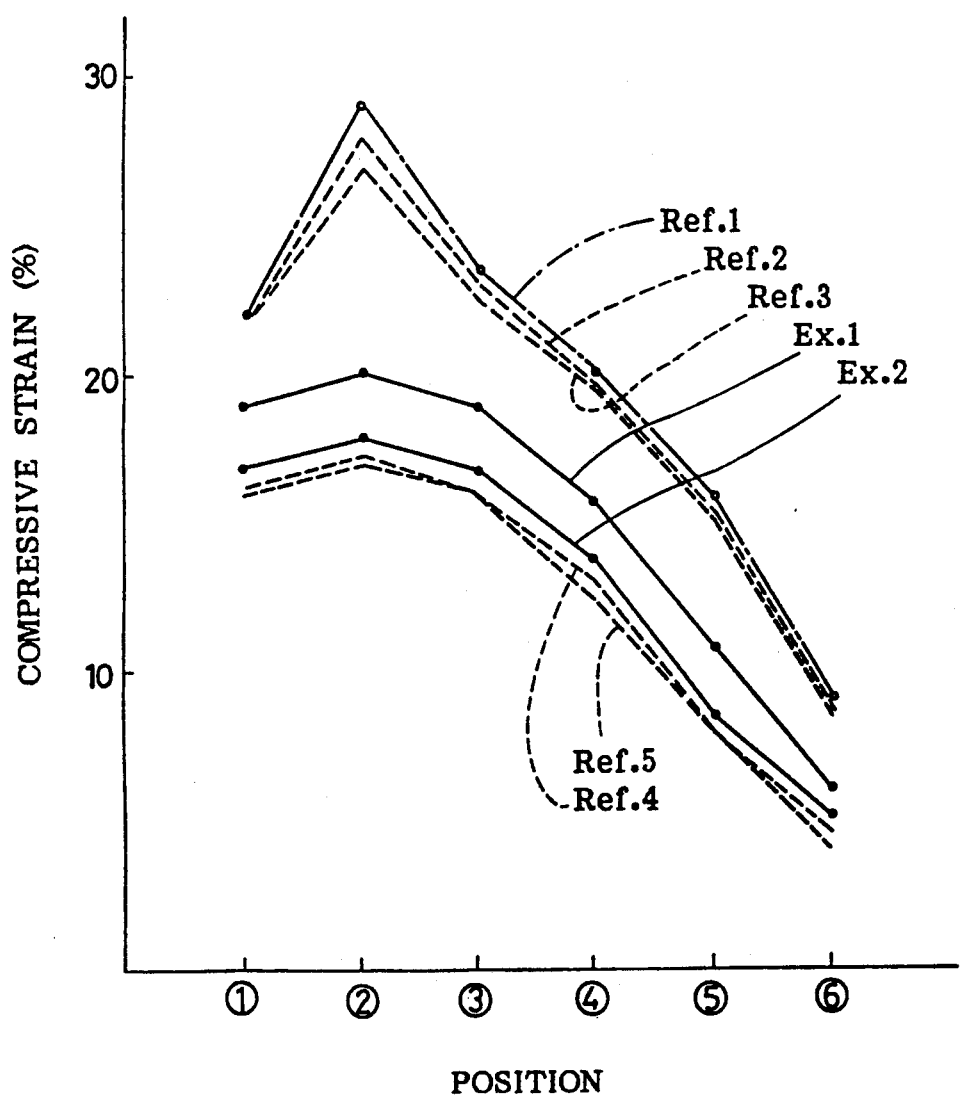
FIG. 4 is a graph showing a relationship between compressive strain and positions in buttress portion.
Figure 5:
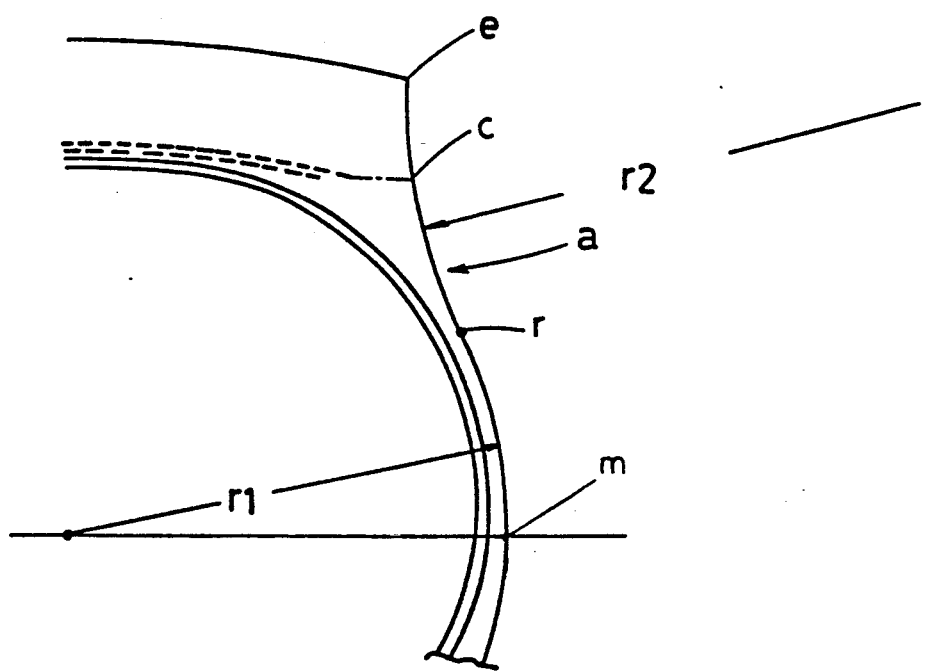
FIG. 5 is sectional view showing the prior art.

The results are shown in FIG. 4, from which it is apparent that the compressive strain of Working Example tires was remarkably decreased in comparison with Reference tires 1-3. Further, even if the angle was increased over 15 degrees (Reference tires 4-5), the strain could not be decreased effectively corresponding to the increase in the angle.

As described above, in the heavy duty radial tires according to the present invention, the specified part of the tire profile is formed based on the straight line inclined axially outwardly at the specified angle with respect to the tangential line to the inwardly arcing standard curve line. Accordingly, the rubber thickness of this part is increased, and the radially outer part which arcs inwardly of the tire is provided with a radial support.

Therefore, the buttress portion is reinforced to reduce compressive strain. As a result, the buttress part is prevented from being creased and cracked, with the heat generation controlled, and the durability is improved.

I claim:

1. A heavy duty radial tire comprising
   a radial carcass having at least one ply of cords extending between bead portions through sidewall portions and a tread portion of the tire,
   a tread disposed radially outside the carcass, and
   a belt including at least two plies of cords disposed radially outside the carcass and inside the tread,
   in a state that the tire is mounted on its regular rim and inflated to its maximum pressure, the tread width between tread edges being not less than 0.73 times the tire maximum width (W), and
   the tire profile between a tread edge and a tire maximum section width point including a radially outer part extending between the tread edge and a point Q, a radially inner part extending between the tire maximum section width point and a point R, and a middle part extending between said points Q and R,
   said radially outer part being defined by a first circular arc arcing inwardly of the tire, the first circular arc having a single radius of curvature R2 and a center outside of the tire,
   said radially inner part being defined by a second circular arc arcing outwardly of the tire, the second circular arc having a single radius of curvature R1 and a center positioned inward of the tire on an axial straight line (Xm) drawn from the tire maximum section width point,
   said point Q being located at a radial height in the range of the edge height of the widest ply of the belt plus or minus 5 mm,
   said point R being located at a radial height defined such that the outwardly arcing second circular arc of the radially inner part and the inwardly arcing first circular arc of the radially outer part extended from said point Q to said point R are smoothly connected to each other at said point R as the inflection point therebetween,
   said middle part being determined by a straight line (N) extended radially inwardly from said point Q toward said point R inclining axially outwardly at an angle of 4 to 15 degrees with respect to a line tangential to the inwardly arcing first circular arc at said point Q, such that said middle part is located axially outside of said inwardly arcing first arc of the radially outer part extended from said point Q to said point R and such that the distance between said middle part and said straight line (N) extended radially inwardly from said point Q toward said point R, measured normal to said middle part, is not more than 2 mm.

2. The heavy duty radial tire according to claim 1, wherein said point R is located at a radial distance, from the tread edge, in a range of 0.21 to 0.30 times the tread width and an axial distance, from the tire equator, in a range of 0.52 to 0.57 times the tread width.

* * * * *